July 18, 1967 A. H. SNELL, JR Re. 26,238

FLOW CONTROL PIPELINE FITTING

Original Filed Feb. 27, 1963 2 Sheets-Sheet 1

Arthur H. Snell, Jr.
INVENTOR.

BY Browning, Simmons, Hyer, & Eickenroht

ATTORNEYS

FLOW CONTROL PIPELINE FITTING

Original Filed Feb. 27, 1963 2 Sheets-Sheet 2

Arthur H. Snell, Jr.
INVENTOR.

BY Browning, Simmons, Hyer, & Eickemeyer
ATTORNEYS

United States Patent Office

Re. 26,238
Reissued July 18, 1967

26,238
FLOW CONTROL PIPELINE FITTING

Arthur H. Snell, Jr., Houston, Tex., assignor to Keystone Valve Corporation, Houston, Tex.

Original No. 3,187,776, dated June 8, 1965, Ser. No. 261,331, Feb. 27, 1963. Application for reissue Nov. 18, 1965, Ser. No. 512,817
6 Claims. (Cl. 138—94.3)

Matter enclosed in heavy brackets [ ] appears in the original patent but forms no part of this reissue specification; matter printed in italics indicates the additions made by reissue.

This invention relates to a fitting of the type commonly referred to as a "line blind" for controlling the flow of fluids in a pipeline.

Line blinds provide a convenient method of controlling the flow of fluid in a pipeline where changes in the flow rate are made infrequently. Most line blinds employ a removable plate which is releasably held in position across the line. Depending upon the rate of flow desired, the opening through the plate can vary from one which equals the inside diameter of the line for unrestricted flow to one with no opening at all to completely stop the flow of fluids in the line.

There is a need for a line blind having a unitary body with a common opening through which both the plate controlling flow and the expandable, telescoping assembly which releasably holds the plate in position can be separately inserted and removed. Obviously, the expandable assembly should be as simple as possible, employing a minimum number of parts and arranged so that as few of the operating parts as possible are exposed to the fluids in the pipeline. There is also a need for a line blind with an operating mechanism which can be partially disassembled for repairs, and for inspection and servicing without having to remove the line blind from the line.

It is one of the principal objects of this invention to provide a line blind for a pipeline which has the needed characteristics just described and which is simple to operate and thus requires a minimum amount of time and labor to change one flow-controlling plate for another.

Other objects and features of the invention will be apparent from the detailed description set out below when considered in connection with the accompanying drawings in which.

Figure 1:
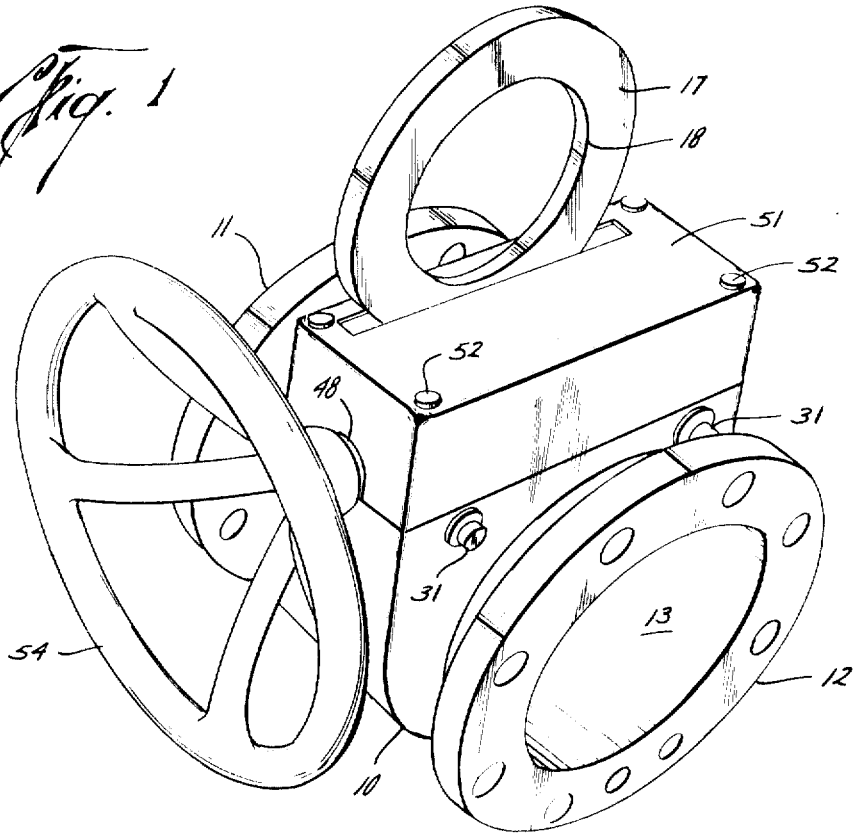
FIG. 1 is an isometric view of a line blind constructed in accordance with this invention.
Figure 2:
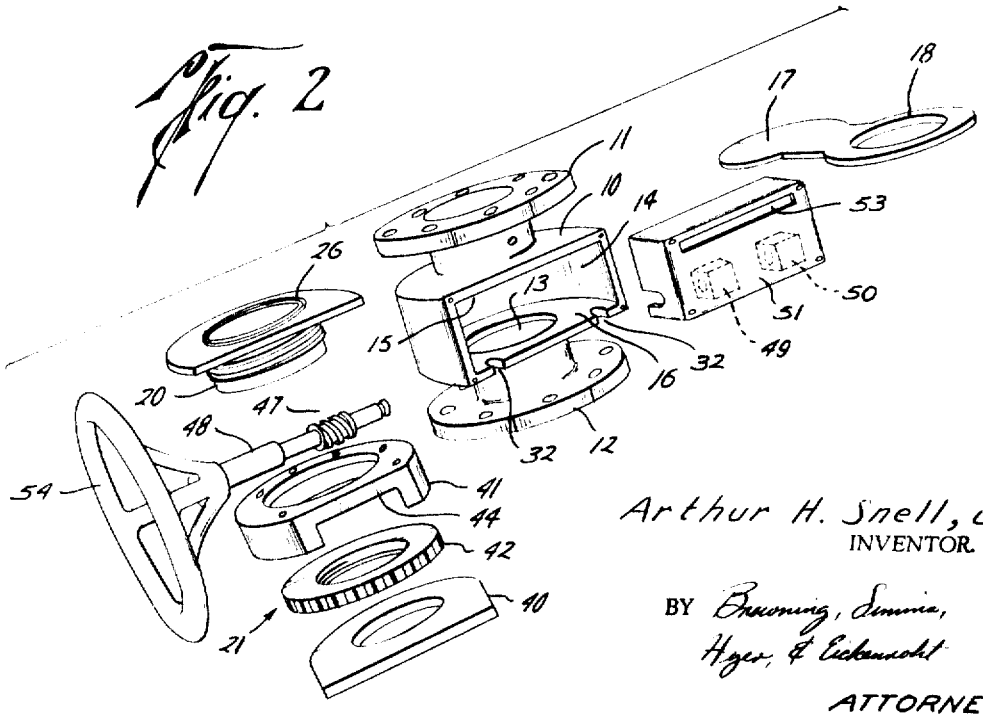
FIG. 2 is an exploded isometric view of the major elements of the line blind illustrated in FIG. 1.

As illustrated in the drawings, the preferred embodiment of the line blind of this invention includes a body 10 provided with flanges 11 and 12 to facilitate connecting the line blind in a pipeline. The body has a passageway 13 which extends longitudinally through the body and which is the same diameter as and coincides with the opening through the pipeline (not shown) in which the fitting is installed. The body is also provided with a lateral opening 14 which is rectangular in cross section and which extends completely across passageway 13. The opening has a width greater than the diameter of the passageway to provide two opposing parallel flat faces, or shoulders, 15 and 16 at the intersection of the passageway and the lateral opening. The body is cylindrically shaped except for the portion above its horizontal center line at the intersection of the passageway and the rectangular opening where it conforms to the opening by being rectangular also. The body could also be described as having a passageway 13 extending longitudinally through it, the passageway having a section of increased diameter to provide two opposing faces, or shoulders, with a rectangularly shaped lateral opening intersecting the passageway between the two faces.

Located in lateral opening 14 and extending transversely across passageway 13 is the flow-controlling plate 17 and the expandable, telescoping assembly which releasably holds plate 17 in engagement with shoulder 15. As shown, the plate 17 has one end with an opening 18 equal to the inside diameter of passageway 13 and the other end blank. Since it is usually desired to either stop the flow of fluids through the line or allow them to flow unrestricted, it is common practice to provide the line blind with a combination plate, like plate 17, having one end blank for stopping the flow of fluids and the other provided with an opening equal to the diameter of the line for unrestricted flow. This combination plate is commonly called a "spectacle plate." Of course, other spectacle plate arrangements could just as easily be used, i.e., a blank plate and an orifice plate, an orifice plate and a full open plate, etc.

Spectacle plates have the added advantage of providing a convenient handle for removing the flow plate in use; and further, where only two flow-control plates are to be used, it insures that the flow-control plate not in use doesn't get lost.

Figure 3:
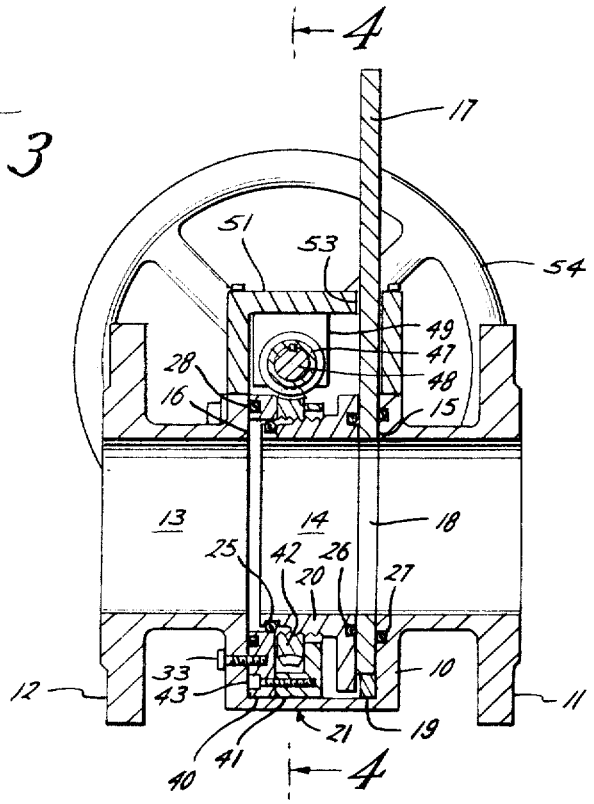
FIG. 3 is a vertical cross-sectional view through the line blind.
Figure 4:
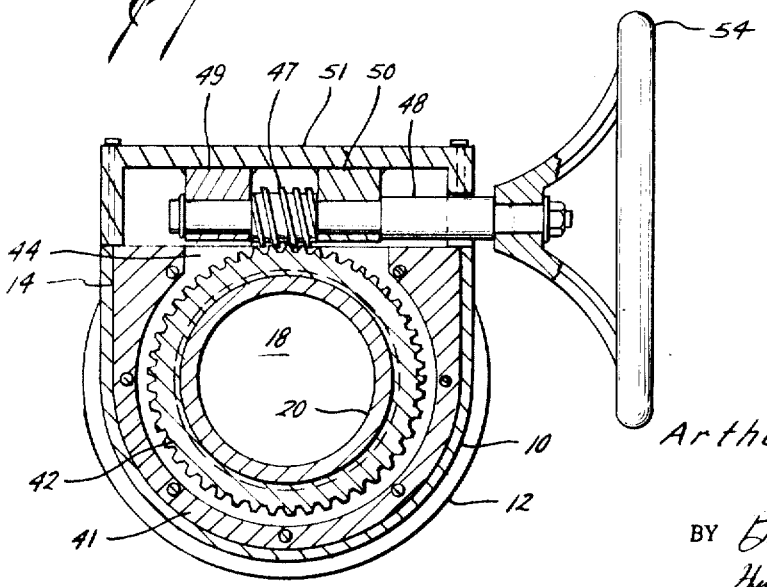
FIG. 4 is a lateral cross-sectional view taken along line 4—4 of FIG. 3.

As shown in FIG. 3, the end of the spectacle plate which is provided with opening 18 is in position in the body. The opening 18 is located so its center line coincides with the center line of the passageway. To do this and also to allow the outside diameter of the plate to be less than the width of opening 14 so that it can be easily inserted in the opening, lugs 19 are welded at spaced intervals around the circular bottom of the body to support the spectacle plate at the proper height.

Holding spectacle plate 17 against shoulder 15 is a telescoping assembly which comprises sleeve 20 and gear assembly 21. Sleeve 20 has a flange on one end engaging plate 17, external threads and a seal ring 25, the latter being arranged to engage the inside surface of gear assembly 21 and provide a moving seal which prevents any fluid from escaping from the line through the assembly. Seal ring 26, carried by the flanged end of the sleeve, and seal ring 27, located in face 15, engage opposite sides of the spectacle plate and, along with seal 28 which seals between gear assembly 21 and face 16, prevent any fluid in passageway 13 from escaping. By arranging these four seal rings in this manner, all of the parts which make up the operating mechanism of the line blind are completely isolated from the fluids carried by the pipeline. This allows the blind to be used in lines carrying highly corrosive fluids without having to provide an operating mechanism which is plated or made from corrosion-resistant material which greatly increases the cost of the blinds. It is necessary, of course, to provide seal rings which are resistant to the particular fluids being carried and either place the few exposed surfaces to resist the corrosive fluids or make them out of corrosive-resistant material. As will be discussed below, arranging the seal rings in this manner also allows the operating mechanism to be inspected, serviced, and partially disassembled without shutting down the line in which the line blind is installed.

The seals can be arranged to be carried by either member being sealed. For example, seal rings 26 and 27 may be mounted on the spectacle plate so as to seal against face 15 and the end of sleeve 20. This makes it somewhat easier to replace the seals but requires similar seals on both ends of the spectacle plate and the seals on the exposed end will be subjected to the deteriorating effects of weather, etc. which are undesirable.

As shown, gear assembly 21 is held against longitudinal movement by machine screws 31. Since these screws are used to hold the assembly against longitudinal movement only, slots 32 are provided in the body to receive the screws so that they need only be loosened to remove the telescoping assembly from the body. A third screw 33 may be used, if desired, to hold the lower end of the gear assembly in position against face 16. This screw must be completely removed, of course, to remove the gear assembly from the body.

The gear assembly includes base member 40 which carries seal ring 28 and gear housing member 41 which is bolted directly to the base member by bolts 43. Both members are annular and have central openings which coincide with passageway 18 and the central opening of sleeve 20. The opening in base member 40 receives seal ring 25 and makes sealing engagement therewith. The opening in gear housing 41 must be large enough to receive sleeve 20 and clear its external threads.

Rotatably mounted in gear housing 41 is ring gear 42 which has gear teeth on its outer periphery and screw threads on its inner periphery. The screw threads are arranged to mate with the external threads on sleeve 20 so that rotation of the ring gear relative to the sleeve will cause longitudinal movement of the sleeve in and out of the gear assembly. In other words, ring gear 42 acts as a nut on the threads of sleeve 20.

Base 40 is shaped to fit body 10; that is, it is U-shaped, having a circular lower portion and a straight-sided upper portion so that, when in position in the body, the body will hold it against rotation. The base in turn holds the gear housing against rotation since it is bolted to it. The flanged end of sleeve 20 is also U-shaped to fit the inner contours of the body to thereby hold the sleeve against rotation also.

Mounted above opening 14 in the body is a worm gear assembly. It includes worm gear 47, shaft 48 which carries the worm gear, bearing blocks 49 and 50 which rotatably support the shaft, housing 51 which supports the bearing blocks and, through them, the entire assembly including hand wheel 54 attached to shaft 48 to facilitate rotation of the worm gear. Housing 51 is attached to the body by bolts 52 and covers the opening 14 in the body and closes it off except for slot 53 through which the spectacle plate extends. The housing also positions shaft 48 laterally across the opening to position worm gear 47 in driving engagement with the gear teeth on the portion of the ring gear which extends through opening 44 in the ring gear housing.

With the operating parts of the line blind arranged in the manner described above, the worm gear assembly can be removed completely, repaired, serviced, or replaced while the line blind is in service. In addition, with the worm gear assembly removed, the teeth on the ring gear are partially exposed for inspection and service. Also, even though they are not exposed for complete inspection, this arrangement allows the internal threads on the ring gear and the external threads on the sleeve to be cleaned and serviced to some extent without having to shut down the line in which the blind is installed.

Another advantage of this construction is the ease with which the entire telescoping assembly can be quickly withdrawn through lateral opening 14 so that the seal rings can be replaced or the assembly replaced or repaired.

OPERATION

Assume that the line blind is in the position illustrated in FIG. 3; that is, the full open position, and it is desired to block off the line downstream for some reason. First, the pressure in the line must be bled down sufficient to allow the line to be opened without danger to the operating personnel. This does not mean that the pressure has to be completely bled off. In some cases, where the pressure is not great, the fluid in the line may be allowed to flow out of the open line blind during the switching operation if the fluid is not detrimental to the surrounding environment. For example, if the line blind is in a water line in open country, considerable water can be lost without creating any damage to the equipment, personnel or to the countryside; or, if the line blind is in a relatively low pressure line such as a suction line for a mud pump or a drilling rig, the amount of mud lost during the switching operation would be negligible.

In any event, before the line blind is opened, the pressure in the line should be bled down to a safe value. Then by rotating the handwheel 54 in a counterclockwise direction, the worm 47 will drive the ring gear 42 in a clockwise direction and with righthand threads on sleeve 20 and ring gear 42 the sleeve will be moved to the left as shown in FIG. 3, causing its flanged end to move out of engagement with the spectacle plate 17, freeing it for removal from body 10. It is then turned over and reinserted into body 10 through slot 53 in housing 51. Handwheel 54 is rotated in a clockwise direction which drives ring gear 42 in a counterclockwise direction, moving sleeve 20 toward spectacle plate 17. This movement is continued until seal rings 26, 27 and 28 are provided with enough compression to again seal passageway 13. When this is accomplished, the line downstream of the valve is blocked off and any necessary repairs, etc., can be made. When they are completed, the line blind can be quickly reopened with a minimum of delay by returning the spectacle plate to the position illustrated in FIG. 3 in the manner described above.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A line blind for a pipeline including: a one-piece body for installation in the pipeline, the body being provided with a fluid passageway for the fluids in the pipeline, the passageway having a section of increased inside diameter to provide two opposing faces, and a lateral opening intersecting the passageway at the section of increased diameter; a separately removable flow plate engaging one of the faces; and an expandable assembly, separately removable through the lateral opening as an assembly, engaging the other face and holding the flow plate in engagement with the first-mentioned face, and provided with an opening through which the fluids in the pipeline may flow which is at least as large as the passageway in the body, said expandable assembly comprising two telescoping members, the first member engageable with the flow plate for holding it against one of the faces and the second member engageable with the other face, means cooperating with the body directly for holding both of the members against rotation relative to the body, a nut held against axial movement relative to the second member but rotatable relative thereto, said nut threaded on the first member and provided with gear teeth on its exterior surface, a worm gear removably mounted in the lateral opening and engaging gear teeth on the nut and means exterior of the body for driving the worm gear.

2. A line blind for a pipeline including: a one-piece body for installation in a pipeline, the body having a passageway for the fluid carried by the pipeline; the passageway being provided with a section of increased diameter to provide two opposing faces; and a lateral opening intersecting the enlarged section of the passage; a flow-control plate engaging one of the faces; and an expandable assembly insertable through the lateral opening to engage the flow-control plate and the other face and hold the flow plate in position in the body, the expandable assembly having an opening therein to allow the passageway of fluids traveling through the pipeline at least as large as the passageway through the body; said expandable assembly comprising two telescoping members, a first member engageable with the flow plate for holding it against one of the faces and a second member engageable with the other face, means on each member engaging the body to hold each member separately against rotation relative to each other and the body, threads on the exterior surface of the first member and a nut held against axial movement relative to the second member but rotatable relative thereto said nut having [gear teeth on its exterior surface] threads on its interior surface [, the latter being] in engagement with the threads on the first member, releasable means for holding the second member in engagement with the other face, and means for rotating the nut to cause the first member to move longitudinally relative to the other member into and out of holding engagement with the flow plate.

3. In a line blind for a pipeline including a body for installation in the pipeline with a flow passageway extending therethrough, the flow passageway having an enlarged section of increased inside diameter to provide two opposing shoulders, a lateral opening in the body intersecting the enlarged section of the passageway, said opening having a width at least as great as the inside diameter of the enlarged section, a removable flow-control plate in sealing engagement with one of the opposing shoulders, an expandable assembly located between the flow-control plate and the other shoulder to hold the plate in sealing engagement with one of the shoulders and sealingly engage the other shoulder, said expandable assembly including two telescoping members a first member engageable with the flow-control plate for holding it in sealing engagement with one of the opposing shoulders and a second member for engaging the other shoulder, said members being held separately against relative rotation by the body, pressure-sealing means between the members, means for expanding and contracting the telescoping members into and out of sealing engagement with the flow-control plate and the other shoulder, including threads on the exterior surface of the first member, a nut held against axial movement by the second member but rotatable relative thereto, said nut having [gear teeth on its exterior surface and] threads on its interior surface [, the latter being] in engagement with the threads on the first member, and means for actuating the expanding and contracting means, said actuating means being carried by the body above the lateral opening.

4. A line blind for a pipeline comprising: a body adapted to be installed in the pipeline, and having a longitudinal passageway for the flow of fluids carried by the pipeline, said passageway having an enlarged portion intermediate the ends of the body to provide two opposing parallel shoulders, said body having a lateral opening between the shoulders having a width equal to the inside diameter of the enlarged portion of the passageway; a telescoping assembly located in the enlarged portion of the passageway in engagement with one of the shoulders, said assembly being removable through the lateral opening, and comprising first and second telescoping members held against rotation by the body, the first member being an externally threaded sleeve, the second member being an annular member encircling the outside of the first member, an internally threaded ring gear rotatably mounted on the second member with its internal threads meshed with the external threads on the first member; a flow-control plate formed to pass through the lateral opening into the body and engage one of the shoulders in the body; a worm gear threadedly engaged with the ring gear; a housing detachably mounted on the body and rotatably supporting the worm gear; and means for rotating the worm gear to thereby rotate the ring gear and move the first member into and out of engagement with the flow-control plate.

5. A line blind for controlling the flow of fluids in a pipeline comprising: a body for installation in the pipeline through the lateral opening; a worm gear in engagement with the ring gear; and a housing removably attached to the body rotatably supporting the worm gear.

*6. A line blind for a pipeline including: a one-piece body for installation in the pipeline, the body being provided with a fluid passageway for the fluids in the pipeline, the passageway having a section of increased inside diameter to provide two opposing faces, and a lateral opening intersecting the passageway at the section of increased diameter; a separately removable flow plate engaging one of the faces; and an expandable assembly, separately removable through the lateral opening as an assembly, engaging the other face and holding the flow plate in engagement with the first-mentioned face, and provided with an opening through which the fluids in the pipeline may flow which is at least as large as the passageway in the body, said expandable assembly comprising two telescoping members, the first member engageable with the flow plate for holding it against one of the faces and the second member engageable with the other face, means cooperating with the body directly for holding both of the members against rotation relative to the body, and means for causing the members to move longitudinally relative to each other to move into and out of holding engagement with the flow plate to allow the flow plate to be removed and replaced with another without removing the expandable assembly.*

References Cited

The following references, cited by the Examiner, are of record in the patented file of this patent or the original patent.

UNITED STATES PATENTS

| | | | |
|---|---|---|---|
| 2,558,247 | 6/1951 | Hammer | 138—94.3 |
| 2,889,853 | 6/1959 | Dryer | 138—94.3 |
| 3,027,135 | 3/1962 | Kellar | 251—392 X |

LAVERNE D. GEIGER, *Primary Examiner.*

C. L. HOUCK, *Assistant Examiner.*